E. B. CUTTEN.
DYNAMO ELECTRIC MACHINE.
APPLICATION FILED SEPT. 27, 1913.
1,136,943.
Patented Apr. 27, 1915.
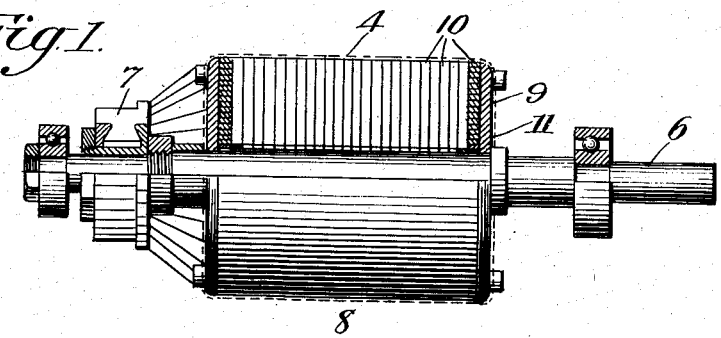
Fig. 1.
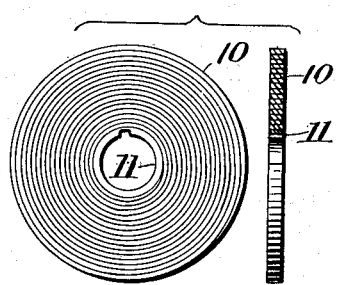
Fig. 2.
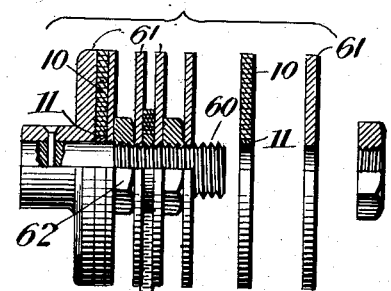
Fig. 3.
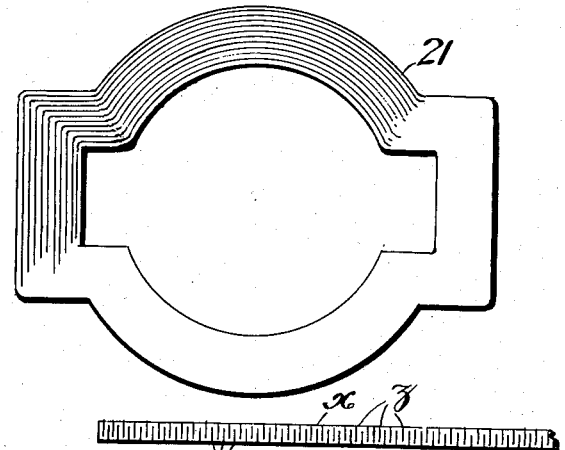
Fig. 4.
Fig. 5.
Fig. 6
Witnesses.
Inventor.

UNITED STATES PATENT OFFICE.

ELISHA B. CUTTEN, OF ERIE, PENNSYLVANIA, ASSIGNOR OF THREE-FOURTHS TO UNITED STATES HORSE SHOE CO., OF ERIE, PENNSYLVANIA, A CORPORATION OF PENNSYLVANIA.

DYNAMO-ELECTRIC MACHINE.

1,136,943.  Specification of Letters Patent.  Patented Apr. 27, 1915.

Application filed September 27, 1913. Serial No. 792,118.

*To all whom it may concern:*

Be it known that I, ELISHA B. CUTTEN, a citizen of the United States, residing at Erie, county of Erie, State of Pennsylvania, have invented certain new and useful Improvements in Dynamo-Electric Machines; and I do hereby declare the following to be a full, clear, and exact description of the invention, such as will enable others skilled in the art to which it appertains to make and use the same.

The invention relates to a novel form of laminated core for dynamo electric machines and the method of making the same, and has for its object to produce and provide a magnetic core for use in electric generators and motors, which will admit of the machines being operated either by direct or alternating current, with a minimum loss due to eddy currents, hysteresis and other similar objectionable heating effects, which heretofore have been regarded as inherent in electrical machines involving a magnetic core or cores which are subject to the inductive effect of adjacent coils or current-carrying conductors.

Two simple forms of application of the invention are illustrated in the accompanying drawings, in which:—

Figure 1 is a side elevation, partly in section, of a motor or generator armature involving the invention. Fig. 2 is an elevation and edge view of one of the armature laminæ. Fig. 3 illustrates the mode of forming the armature laminæ. Fig. 4 is an elevation of one of the field core laminæ. Fig. 5 is a vertical section therethrough. Fig. 6 is a fragmentary plan view of a preferred form of strip or ribbon of which the individual laminæ of the armature core are constructed.

The method of forming the individual laminæ, whether the same be intended for the armature core or the field core of a motor or generator, consists in winding a thin filament of soft iron, preferably in the form of a narrow flat ribbon $x$, in continuous convolutions, upon a suitable base, until a flat disk-like element is produced having the desired contour, or configuration. In order to interrupt the electrical continuity of the ribbons, of which the individual laminæ are formed, for the purpose of preventing induced currents which are generated in the armature core and which flow uninterruptedly in the old forms of sheet laminæ, the ribbons employed in building up the armature core laminæ are preferably slitted along each edge by narrow incisions running inwardly from the edges and preferably at right angles thereto, and extending through the body of the ribbon, but only part way across the same. Preferably, these slits or incisions on opposite edges of the ribbon are arranged in staggered relation so that the solid material of the ribbon, as defined by the slits or incisions, is of sinuous form with the successive portions thereof separated by the slits, such as $y$, along one edge and the slits $z$ on the other edge, as illustrated in Figs. 3 and 6. These slits are preferably formed in the ribbon before the latter is wound on the form to build up the individual laminæ. As a matter of convenience and economy, however, it is preferable that the ribbon be preliminarily slitted before it is wound to appropriate form to build up the laminæ.

In constructing a core for a motor or generator armature, such as illustrated in Fig. 1, the body portion 8 of the core consists of a series of laminæ 10, each of which is mounted upon a central bushing or sleeve 11 of non-magnetic material, the several laminæ being arranged in juxta-position on the shaft 6 and held securely thereon by means of end plates 9, the core being locked to the shaft by a suitable spline connection between said shaft and the rings or bushings 11 of the individual laminæ. The armature coils 14 are applied to the core in any suitable manner, and the ends of said coils are connected to the proper segments of the commutator 7. The method of forming the individual armature core laminæ, as illustrated in Fig. 3, consists in winding the slitted filamentary ribbon of soft iron in continuous superposed convolutions upon a central bushing 11, which is first mounted upon a spindle 60 and held between clamping plates 61 by nuts 62 threaded on the spindle. The winding of the ribbon is continued to form a disk of the desired diameter, as illustrated in Fig. 2, after which the free end of the ribbon is attached to the disk by cementing, welding or other appropriate method. Preferably, the spindle 60 is made sufficiently long to accommodate a number of laminæ, so that several of the said laminæ may be constructed simultaneously, as illustrated in Fig. 3. The laminæ 10 as thus constructed are assembled in stacks of sufficient size to form the core of the armature 8, the several laminæ preferably being subjected to pressure during the assembling operation and secured together by a suitable cement, which upon setting, makes the armature core a practically solid, self-sustaining body.

The construction of the individual laminæ from the filamentary iron in the form of narrow ribbons, and the interruption of the continuity of the ribbons by the staggered slits or incisions, largely prevents the formation of induced or eddy currents in the armature core and therefore eliminates in a large measure a serious defect in machines of this character due to the heating of the armature core, which could not be avoided heretofore even in cases wherein the core was formed of uninterrupted sheet laminæ.

As heretofore indicated, the invention is applicable to magnetic cores of other types and forms of electrical apparatus, such as the magnetic field cores of dynamo electric generators and motors.

In Figs. 4 and 5, there is illustrated a typical lamina, constructed in accordance with the invention, to form the field core of a dynamo electric generator or motor. In this case the core of the field magnet is formed of juxta-posed laminæ constructed in practically the same manner as the laminæ forming the hereinbefore described armature core, namely by winding a strip of thin iron ribbon, without marginal slits, in successive turns or convolutions about a suitable form to produce a general ring-like lamina of the desired form and dimensions. The individual laminæ thus constructed are assembled in suitable stacks to constitute the desired core and are securely united by suitable cement and under pressure to produce a substantially solid core of a field magnet, which may be applied to or removed from the machine as an entirety. As indicated, the several strips of ribbon of soft iron are wound on a form to produce the individual laminæ, the successive convolutions being superposed and laid adjacent to each other, and as in the case of the armature core, may be separated from each other by a coating of shellac or other suitable cement, if desired.

It will be particularly noted that in each case, each lamina consists of a series of superposed layers or convolutions of narrow filamentary iron, preferably in the form of a ribbon $x$, and, in the case of the armature core, each convolution being interrupted transversely by a multiplicity of staggered slits or incisions $y$ and $z$ extending inwardly from the edges of the ribbon. The convolutions with or without cement or binding material between them, serve to break the continuity of the individual laminæ in a radial direction, and the slits $y$ and $z$ likewise break the continuity of the ribbon longitudinally, at a multiplicity of points, so that the generation of induced or eddy currents in the magnetic armature core thus formed is practically eliminated.

What I claim is:—

1. The method of making laminated cores for electrical apparatus, which consists in forming each individual lamina of closely wound convolutions of iron ribbon, and assembling a series of laminæ so formed in closely juxta-posed relation.

2. The method of making laminated cores for electrical apparatus, which consists in forming each individual lamina of closely wound convolutions of slitted iron ribbon, and assembling a series of laminæ so formed in closely juxta-posed relation.

3. The method of making laminated cores for electrical apparatus, which consists in laterally slitting iron ribbon forming each individual lamina of closely wound convolutions of such laterally slitted iron ribbon, and assembling a series of laminæ so formed in closely juxta-posed relation.

4. The method of making laminated cores for electrical apparatus, which consists in slitting the opposite edges of iron ribbon in staggered relation, forming each individual lamina of closely wound convolutions of such slitted iron ribbon, and assembling a series of laminæ so formed in closely juxta-posed relation.

5. The method of making laminated cores for electrical apparatus, which consists in laterally slitting filamentary iron, forming individual laminæ of closely wound convolutions of such filamentary iron, juxta-posing a series of laminæ so formed, and uniting the same by pressure and a suitable binding agent.

6. A magnetic core for dynamo electric machines consisting of a series of contiguous laminæ, the individual laminæ consisting of closely wound superposed convolutions of iron ribbon.

7. A magnetic core for dynamo electric machines consisting of a series of contiguous laminæ, the individual laminæ having the form of the cross sectional contour of the core and consisting of closely wound superposed convolutions of filamentary iron.

8. A magnetic armature core for dynamo electric machines comprising juxta-posed laminæ, the individual laminæ consisting of closely wound superposed convolutions of laterally slitted iron ribbon.

9. A magnetic armature core for dynamo electric machines comprising juxta-posed laminæ, the individual laminæ consisting of closely wound superposed convolutions of iron ribbon having its edges provided with slits, the slits in opposite edges being staggered with relation to each other.

In testimony whereof I affix my signature, in presence of two witnesses.

ELISHA B. CUTTEN.

Witnesses:
 THOMAS DURANT,
 ELENOR C. SCHUERMANN.